April 6, 1954
G. DEL GROSSO
2,674,476
CONNECTING DEVICE
Filed Oct. 6, 1948
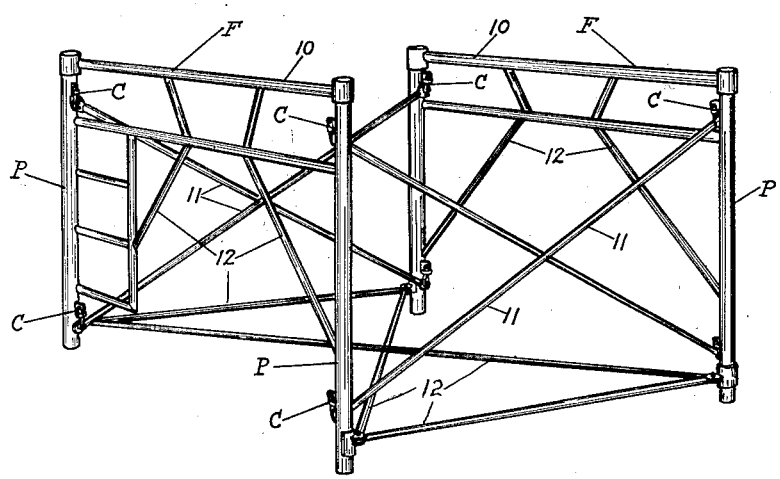
FIG.—1
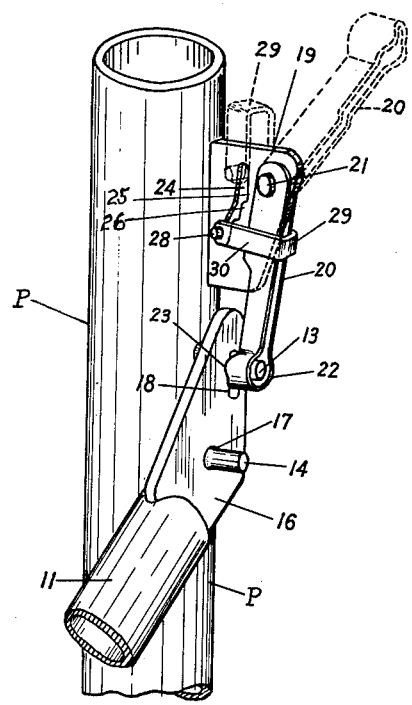
FIG.—2
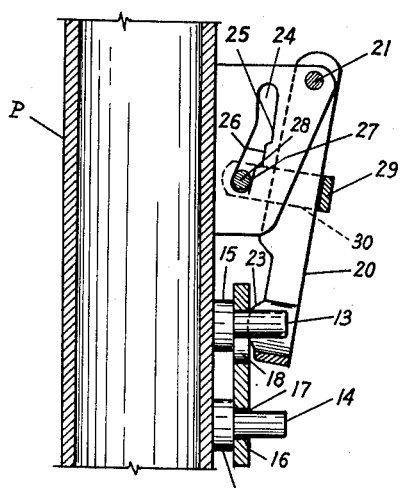
FIG.—3
INVENTOR.
Gerard del Grosso
BY
Lamphere and Van Valkenburgh
ATTORNEYS Patented Apr. 6, 1954

2,674,476

UNITED STATES PATENT OFFICE 2,674,476

CONNECTING DEVICE

Gerard del Grosso, St. Louis, Mo., assignor to Automatic Devices, Incorporated, St. Louis, Mo., a corporation of Missouri Application October 6, 1948, Serial No. 53,126

8 Claims. (Cl. 287—54)

This invention relates to connecting means whereby two members may be joined together.

One of the objects of the invention is to so construct an improved connecting means that two members may be connected in a positive manner and disconnected by quick and easy operations.

Another object is to provide improved means for positively holding two members in connecting positions, which holding can be quickly accomplished by simple movements of elements forming the holding means.

A more specific object is to provide improved means for holding a member positioned on a pin, which holding means is so designed that it can be quickly made operative to perform its holding function, or to be made inoperative to permit the member to be removed from the pin.

A further object is to provide means for positively holding a member in a connecting position in which a pivoted element is arranged to cooperate with the member and latch means is so associated with the pivoted element that said element can be quickly locked so as to hold the member in connecting position.

Another and particular object is to provide improved means for joining a brace to a post in a positive manner, yet permitting connection and disconnection of the brace and post by rapid and simple operations without any necessity of manipulation of a threaded member or other time consuming connecting means.

Other objects of my invention will become apparent from the following description taken in connection with the accompanying drawing in which:

Figure 1 is a view of a section of a scaffold showing, by way of example only, my improved connecting means employed to connect the ends of brace rods with posts of end frames;

Figure 2 is an enlarged perspective view showing details of the connecting means and the manner of operation of its elements; and Figure 3 is a vertical sectional view showing the elements of the connecting means in their locked positions.

Referring to the drawings in detail, and first to Figure 1, there is shown my improved connecting means as forming a part of a knock-down scaffold which is designed for portability and erection at the place where it is to be used. The scaffold shown has two end frames F, each provided with posts P and connecting brace bars 10 as shown. To form the scaffold, the two end members will be connected together by brace rods 11. These brace rods will be diagonally arranged in order to form an S-type of brace between the end frames. Other brace rods 12 will be employed as shown, some being a part of the end frames and others connecting the end frames together. It will be noted that one end of each rod will be connected to the upper end of a post of an end frame and the other end will be connected to the lower end of a like sided post of the other end frame. The connection is made on the inside of the posts so as to be protected. The connection between the brace rods and a post is accomplished by my improved connecting means, generally indicated by the letter C and shown in detail in Figures 2 and 3. By means of this improved connecting means it will be possible to quickly connect and disconnect the brace rods 11 from the end frames to thereby permit rapid erection of the scaffold or the taking it down so that it can be easily transported.

Referring to the details of the improved connecting means, as disclosed in Figures 2 and 3 which is the particular structure for attaching the upper ends of the diagonal braces, the post P of an end frame is provided with two vertically spaced, laterally extending pins 13 and 14 which may be welded to the post by enlarged base portions to thus form shoulders 15. Other securement of the pins may be employed when found desirable. The ends of each brace rod 11, which is shown as tubular in constructiton, are provided with flat sections 16 in which is provided a round hole 17 and a slot 18. The round hole is arranged to receive the lower pin 14 and the slot is arranged to receive the upper pin 13, the reason for the slot being to permit the end of a brace rod to be readily mounted on the pins, even though during manufacture the spacing between the pins should vary slightly. The pins are of such length as to extend beyond the flat end sections.

Above the pins and secured to the post by welding is a bracket 19 in the form of a plate which is arranged to be in a position extending radially outward from the tubular post. To the outer, upper corner of this plate bracket is pivoted an arm 20. It will be noted that the arm is U-shaped in form with one leg of the U-shaped arm lying on one side of the bracket and the other leg on the opposite side of the bracket with the pivot pin 21 extending through the ends of both legs and the interposed portion of the bracket. The outer free end of the arm, which is the closed part of the U-shaped member, is looped in a manner to provide a rounded opening 22 and the length of the arm is such that this opening can receive the outer end of the pin 13 secured to the post. The inside end of the arm 20 adjacent the opening 22, which receives the pin, has rounded nose portions 23 which will engage the flat sections on the end of the brace rod when mounted on the pins, as shown in the drawings.

The plate bracket 19, carried by the post and upon which the arm is pivoted, is provided with an elongated slot 24 which is arranged in the bracket inwardly of the pivot pin of the arm. This slot has its side adjacent the arm stepped to provide three surfaces 25, 26 and 27, each of which has a different angle with the vertical. The upper or first surface 25 has the least angle and the angles increase progressively for the surfaces 26 and 27. The slot 24 is arranged to receive a pivot pin 28 of a latch 29. This latch is U-shaped and the legs 30 are so spaced apart that they can freely receive both the bracket and the legs of the arm. The position of the pivot pin 28, with respect to the closed end of the U-shaped latch, is such that when the latch is slid downwardly, with the pin moving downwardly in the slot, the closed end of the latch will slide along the arm and force it inwardly so the free lower end of said arm will engage and apply pressure to the flat end section of the brace rod 11.

The stepped surfaces 25, 26 and 27 of the slot permit the connecting means to hold several braces on the pin 13. The construction is such that when one brace, such as 11 as shown, is attached, the pin 28 of the latch will cooperate with lower angular surface 27 to accomplish holding of the arm tight against end 16 of the brace. If two braces were desired to be attached to pin 13, as in line scaffold erection, then pin 28 of the latch would cooperate with the angular surface 26 of the slot. In event three braces were desired to be connected to pin 13, the pin 28 of the latch would cooperate with the top surface 25 of the slot. In all attaching, regardless of the number of braces attached, the angular surface with which latch pin 28 cooperates is such that the latch will force the arm 20 inwardly into tight holding position. The U end of the latch, during holding, will always be parallel with the arm.

It will thus be seen from the foregoing described connecting means that the latch can positively prevent any outward swinging of the arm about its pivot pin, and further the arm will be so held in pressure engagement with the end of the brace rod as to provide a rigid connection between it and the post. The latch can be readily moved upwardly from its locking and holding position and thus move the closed end of the latch away from the arm 20. When the pin 28 of the latch is moved completely to the upper end of the slot, the latch will be in such a position with respect to the arm that it can be swung over the pivoted end of the arm and also over the outer upper end of the bracket to the position as indicated in dashed lines in Figure 2. The latch will then no longer be effective to hold the arm and consequently the arm can be swung outwardly and upwardly to such a position as shown in dashed lines in Figure 2. The arm is thus completely freed of the pin 13 and the brace rod 11 and additional braces, if any, are free to be removed from the pins 13 and 14 or pin 13 only, thereby disconnecting the brace rod and post.

It will be seen that the connecting means is simple in construction, positive in operation and also operative so as to permit quick attaching and detaching of the end of a brace rod or brace rods and a post. To disconnect the end of a brace rod from a post, the latch need only be pushed upwardly to a position where it can be swung over the top of the bracket. The rod is then free to be taken off the pins since the arm is no longer held from any outward movement. The latch construction eliminates the necessity for any threaded members and nuts which take time in removing and applying. Thus, considerable time can be saved in connecting two members together by the use of the improved connecting means. It will also be noted that the latch, to assume its holding position, must always move downwardly, thus jarring, vibrations, etc. will not tend to loosen the latch. All parts of the connecting means are permanently attached to the post and cannot become lost, as would be the case if bolts were used with removable nuts, as has been prior practice, particularly in scaffold structure.

In describing the structure embodying my invention, a specific form has been shown and also there has been shown specific members to be connected together. It is to be understood, however, that the showing and description is by way of example only. The particular structure shown can be modified in various ways and yet obtain the same results. The connecting means could, if desired, involve only one pin, such as the pin 13. Such a single pin connection is shown in Figure 1 for the lower ends of the diagonal braces 11. Thus, if a brace should be bent, it can still be easily attached, due to the single pin connection at one end. It is also believed to be apparent that the latch arrangement for cooperating with the arm to hold it in locked position can take other forms. Therefore, being fully aware of the possibility of modifications in the structure disclosed without departing from the fundamental principles of my invention, it is intended that the scope of the invention is not to be limited in any manner except as set forth in the appended claims.

What is claimed is:

1. In connecting means for two members, said means comprising a pin carried by one member and an opening in the other member receiving the pin, an arm pivoted at one end to one of said members and swingable to a position where a portion spaced from the pivot will engage the other member on a side to prevent the pin from being disengaged from the opening by relative movement of the members, pivoted latch means also carried by the same member as the arm, and means for so mounting the pivot of the latch means including an angular slot that the latch means can be moved to a position holding the arm engaged with said other member.

2. In connecting means for a post and rod, pins carried by the post and said rod being provided with openings for receiving the pins, one of said pins extending beyond the rod when received in its opening, a plate bracket secured to extend outwardly from the post in spaced relation to the rod when mounted on the pins, a U-shaped arm having its legs positioned on opposite sides of the plate bracket and pivoted thereto so that the turned end can be swung over the end of the pin extending beyond the rod when the rod is mounted on the pins, and latch means for holding the arm on the pin and against the rod or permitting it to be swung free of the pin so that the rod can be removed from the pin, said latch means comprising a U-shaped member having a pivot pin extending across its legs, and a slot having an angular surface in the plate bracket and receiving the pivot pin, said slot being so positioned in the bracket as to permit the U-shaped member to be swung over the arm and to a position where the pin acting on the angular surface of the slot will cause the U-shaped member to apply pressure to and hold the arm engaged with the rod and the rod on the pin.

3. In connecting means for a post and brace rod of a scaffold, pins carried by the post and said rod being provided with openings for receiving the pins, one of said pins extending beyond the rod when received in its opening, a plate bracket secured to extend outwardly from the post in spaced relation to the rod when mounted on the pins, a U-shaped arm having its legs positioned on opposite sides of the plate bracket and pivoted thereto so that the turned end can be swung over the end of the pin extending beyond the rod when the rod is mounted on the pins, and latch means for holding the arm on the pin and against the rod or permitting it to be swung free of the pin so that the rod can be removed from the pin, said latch means comprising a U-shaped member having a pivot pin extending across its legs, and a stepped slot in the plate bracket receiving the pivot pin, said slot being so positioned in the bracket as to permit the U-shaped member to be moved over the arm and to a position where the pin in the slot will cause the closed end of the U-shaped member to engage the arm and hold it engaged with the rod or said U-shaped member and its pin can be moved so that the U-shaped member can be swung over the pivot of the arm to thus permit the arm to swing free of the pin received in the brace rod.

4. In means for quickly connecting and disconnecting a brace rod to a scaffold frame post, an outwardly extending pin carried by the post with its axis at right angles to the longitudinal axis of the post, said rod having a hole to permit the rod to be slipped on the pin, a single plate member fixed to the post adjacent the pin, an element pivoted to the member and free to swing to a position where a portion thereof can engage the outside surface of the brace rod when mounted on the pin, and latch means carried by the said member and movable to a position engaging the pivoted element between its pivot and the portion engaging the outside of the brace rod to thereby insure the holding of the said brace rod on the pin.

5. In means for quickly connecting and disconnecting a brace rod to a scaffold frame post, an outwardly extending pin carried by the post, said rod having a hole to permit the rod to be slipped on the pin, a member carried by the post adjacent the pin, an element pivoted to the member and free to swing to a position where a portion thereof can engage the outside of the brace rod when mounted on the pin, and U-shaped latch means carried by the said member and swingable to a position over the pivoted element where its looped end engages the pivoted element between its pivot and the portion engaging the outside of the brace rod to thereby insure the holding of the said brace rod on the pin.

6. In connecting means for permitting a rigid frame member and a rod or like member to be quickly connected together or disconnected, said means comprising interengaging means carried by the members permitting their connection by relative movement of the rod toward the frame member, a pivoted element separate from the interengaging means, carried by the frame member, said element being free to be swung in a plane extending in the direction corresponding to the relative movement establishing connection of the interengaging means to a position where a portion of the element spaced from the pivot can engage with the other member so as to prevent its movement to cause disengagement of the interengaging means, and a swingable latch element carried by the frame member and free to be movable to a position engaging the pivoted element between its pivot and the said spaced portion to thereby hold the pivoted element in position to prevent disengaging of the interengaging means of the two members or swingable to another position past the pivot of the pivoted element to be free of the pivoted element so that it can be swung to a position permitting the rod to be moved so as to bring about disengagement of the interengaging means.

7. In connecting means for permitting a movable member to be connected with a fixed frame member, said means comprising a projection carried by the frame member over which the movable member can be moved to an interengaging relation, an element pivoted to the frame at a point away from the projection and free to be swung to a position where a portion spaced from the pivot can apply pressure to the movable member so as to hold it against the frame and prevent its movement off the projection, and means comprising a movable latch element and cooperating cam means carried by the frame member, said cam means being rigid with the member carrying it and said movable element being free to be moved to a position engaging the pivoted element between its pivot and the said spaced portion and thereby apply pressure to and hold the pivoted element in position by action of the cam means whereby disengaging of the movable member off the projection is prevented.

8. In connecting means for permitting two members to be quickly connected together or disconnected, said means comprising interengaging means carried by the members permitting their connection by relative movement toward each other, a pivoted arm carried by one member and free to be swung to a position where a portion spaced from the pivot can cooperate with the other member so as to prevent its movement to disengage the interengaging means, and a latch means for the pivoted arm, said one member having a slot for receiving a portion of the latch means to thereby permit the latch to be positioned by a sliding movement in the slot so as to assume engagement with the arm between its pivot and said spaced portion and thereby so hold it that the members cannot have such movement that disengagement of the interengaging means will take place.

References Cited in the file of this patent

UNITED STATES PATENTS

| Number | Name | Date |
|---|---|---|
| 444,717 | Stout | Jan. 13, 1891 |
| 590,997 | Masser | Oct. 5, 1897 |
| 949,938 | Michael | Feb. 22, 1910 |
| 1,274,006 | Clarke et al. | July 30, 1918 |
| 1,314,114 | Anderson | Aug. 26, 1919 |
| 1,360,924 | Gilarski | Nov. 30, 1920 |
| 1,785,882 | Taylor | Dec. 20, 1930 |
| 2,132,075 | Keefer | Oct. 4, 1938 |
| 2,331,806 | Shakespeare | Oct. 12, 1943 |
| 2,379,970 | Koebel | July 10, 1945 |
| 2,449,251 | Rogoff | Sept. 14, 1948 |